(12) United States Patent
Russell et al.

(10) Patent No.: US 11,674,367 B2
(45) Date of Patent: Jun. 13, 2023

(54) SYSTEM AND METHOD FOR SELECTING FLUID SYSTEMS FOR HYDRAULIC FRACTURING

(71) Applicant: Halliburton Energy Services, Inc., Houston, TX (US)

(72) Inventors: Aaron Gene Russell, Humble, TX (US); Baidurja Ray, Houston, TX (US); Dinesh Ananda Shetty, Sugarland, TX (US); Christopher Austin Lewis, Houston, TX (US); Larry Steven Eoff, Porter, TX (US); Janette Cortez Montalvo, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 722 days.

(21) Appl. No.: 16/675,453

(22) Filed: Nov. 6, 2019

(65) Prior Publication Data

US 2021/0131235 A1    May 6, 2021

(51) Int. Cl.
*G06F 30/20* (2020.01)
*E21B 41/00* (2006.01)
(Continued)

(52) U.S. Cl.
CPC ............ *E21B 41/0092* (2013.01); *C09K 8/62* (2013.01); *C09K 8/80* (2013.01); *E21B 43/267* (2013.01);
(Continued)

(58) Field of Classification Search
CPC .... E21B 41/0092; E21B 43/267; E21B 47/06; C09K 8/62; C09K 8/80; G06Q 10/06; G06Q 10/06315; G06Q 50/02
(Continued)

(56) References Cited

U.S. PATENT DOCUMENTS

| 8,372,789 B2 | 2/2013 | Harris et al. |
| 10,197,489 B2 | 2/2019 | McCarty et al. |

(Continued)

FOREIGN PATENT DOCUMENTS

| EP | 2774066 B1 | 5/2019 |
| WO | 2013055930 A1 | 4/2013 |
| WO | 2018117890 A1 | 6/2018 |

OTHER PUBLICATIONS

Cohen et al. (Optimum Fluid and Proppant Selection for Hydraulic Fracturing in Shale Gas Reservoirs: a Parametric Study Based on Fracturing-to-Production Simulations, 18 pages. (Year: 2013).*
(Continued)

*Primary Examiner* — Andre Pierre Louis
(74) *Attorney, Agent, or Firm* — Michael Jenney; Parker Justiss, P.C.

(57) ABSTRACT

A workflow for fracturing a subterranean formation includes providing fracturing databases or models for the hydrocarbon wellbore, selecting one or more fracturing fluid systems for fracturing the subterranean formation based on the fracturing databases or models and recommending at least one of the one or more selected fracturing fluid systems for fracturing the subterranean formation. Additionally, a workflow controller for fracturing a subterranean formation includes a workflow processing unit having fracturing models or databases to determine functional aspects of one or more fracturing fluid systems to provide a fracturing fluid system recommendation for the subterranean formation, and a fracturing fluid delivery unit that applies the fracturing fluid system recommendation to the subterranean formation. A hydrocarbon wellbore fracturing system for a subterranean formation is also provided.

21 Claims, 5 Drawing Sheets

(51) Int. Cl.
  *C09K 8/62* (2006.01)
  *C09K 8/80* (2006.01)
  *G06Q 50/02* (2012.01)
  *E21B 47/06* (2012.01)
  *G06Q 10/0631* (2023.01)
  *E21B 43/267* (2006.01)

(52) U.S. Cl.
  CPC ....... *E21B 47/06* (2013.01); *G06Q 10/06315* (2013.01); *G06Q 50/02* (2013.01)

(58) Field of Classification Search
  USPC .................................................... 703/9, 10
  See application file for complete search history.

(56) References Cited

U.S. PATENT DOCUMENTS

2008/0164021 A1* 7/2008 Dykstra ................ E21B 43/267
                                                          166/250.1
2017/0350224 A1* 12/2017 Green .................... E21B 49/02
2021/0017844 A1* 1/2021 Perez .................. E21B 41/0092

OTHER PUBLICATIONS

Friehauf et al. (Fluid Selection for Energized Hydraulic Fractures, 17 pages . (Year: 2009).*

\* cited by examiner

SYSTEM AND METHOD FOR SELECTING FLUID SYSTEMS FOR HYDRAULIC FRACTURING

TECHNICAL FIELD

This application is directed, in general, to subterranean formation fracturing and, more specifically, to a method of workflow processing for fracturing a hydrocarbon wellbore formation and a wellbore fracturing system for a subterranean formation.

BACKGROUND

Hydraulic fracturing or "Tracking" is a type of subsurface well stimulation, whereby formation fluid removal is enhanced by increasing well productivity. The process of fracking, also known as induced hydraulic fracturing, involves mixing a formation proppant (e.g., sand) and chemicals in water to form a formation fracturing fluid (i.e., a fracturing fluid) and injecting the fracturing fluid at a high pressure through a wellbore into a subterranean formation. Small fractures are formed, allowing formation fluids (e.g., formation gas, petroleum, and brine water), to migrate into the wellbore for harvesting. Once the hydraulic pressure is reduced back to equilibrium, the sand or other formation proppant particles hold the fractures open.

Multi-stage hydraulic fracturing is an advancement that provides harvesting of fluids along a single wellbore or fracturing string. The fracturing string, usually for vertical or horizontal wellbores, passes through different geological zones. Some geological zones do not require harvesting, since desired natural resources are not located in those zones. These zones can be isolated so that no fracking action occurs in these zones that are empty of desired natural resources. Other zones having natural resources employ portions of the fracturing string to harvest these productive zones.

Instead of having to alternate between drilling deeper and fracturing operations, a system of fracking sleeves and packers can be installed within a wellbore to form the fracturing string in a multi-stage fracturing process. The sleeves and packers are positioned within zones of the wellbore. Fracking can be performed in stages by selectively activating sleeves and packers, thereby isolating particular subterranean zones. Each target zone can then be fracked stage by stage, for example, by sealing off selected zones, and perforating or fracturing without interruptions due to having to drill between each fracturing stage.

SUMMARY

The disclosure provides a workflow for fracturing a subterranean formation. In one example, the workflow includes: (1) qualifying equipment, logistic and environmental wellsite conditions and constraints for fracturing the subterranean formation, (2) determining functional aspects of one or more fracturing fluid systems to meet the equipment, logistic or environmental conditions and constraints for fracturing the subterranean formation based on fracturing databases or models, and (3) recommending at least one of the one or more fracturing fluid systems for use in fracturing the subterranean formation.

The disclosure also provides a workflow controller for fracturing a subterranean formation. In one example, the workflow controller includes: (1) a fracturing fluid delivery unit configured to apply a fracturing fluid system recommendation to the subterranean formation, and (2) a workflow processing unit configured to determine functional aspects of one or more fracturing fluid systems from fracturing models or databases to provide the fracturing fluid system recommendation for the subterranean formation.

The disclosure further provides a hydrocarbon wellbore fracturing system for a subterranean formation. In one example, the hydrocarbon wellbore fracturing system includes: (1) wellbore fracturing resources coupled through a wellbore conveyance to the subterranean formation. (2) a fracturing fluid delivery unit that applies a fracturing fluid system recommendation to the subterranean formation, and (3) a workflow processing unit that determines functional aspects of one or more fracturing fluid systems from fracturing models or databases to provide the fracturing fluid system recommendation for the subterranean formation.

BRIEF DESCRIPTION

Reference is now made to the following descriptions taken in conjunction with the accompanying drawings, in which.

DETAILED DESCRIPTION

Figure 1:
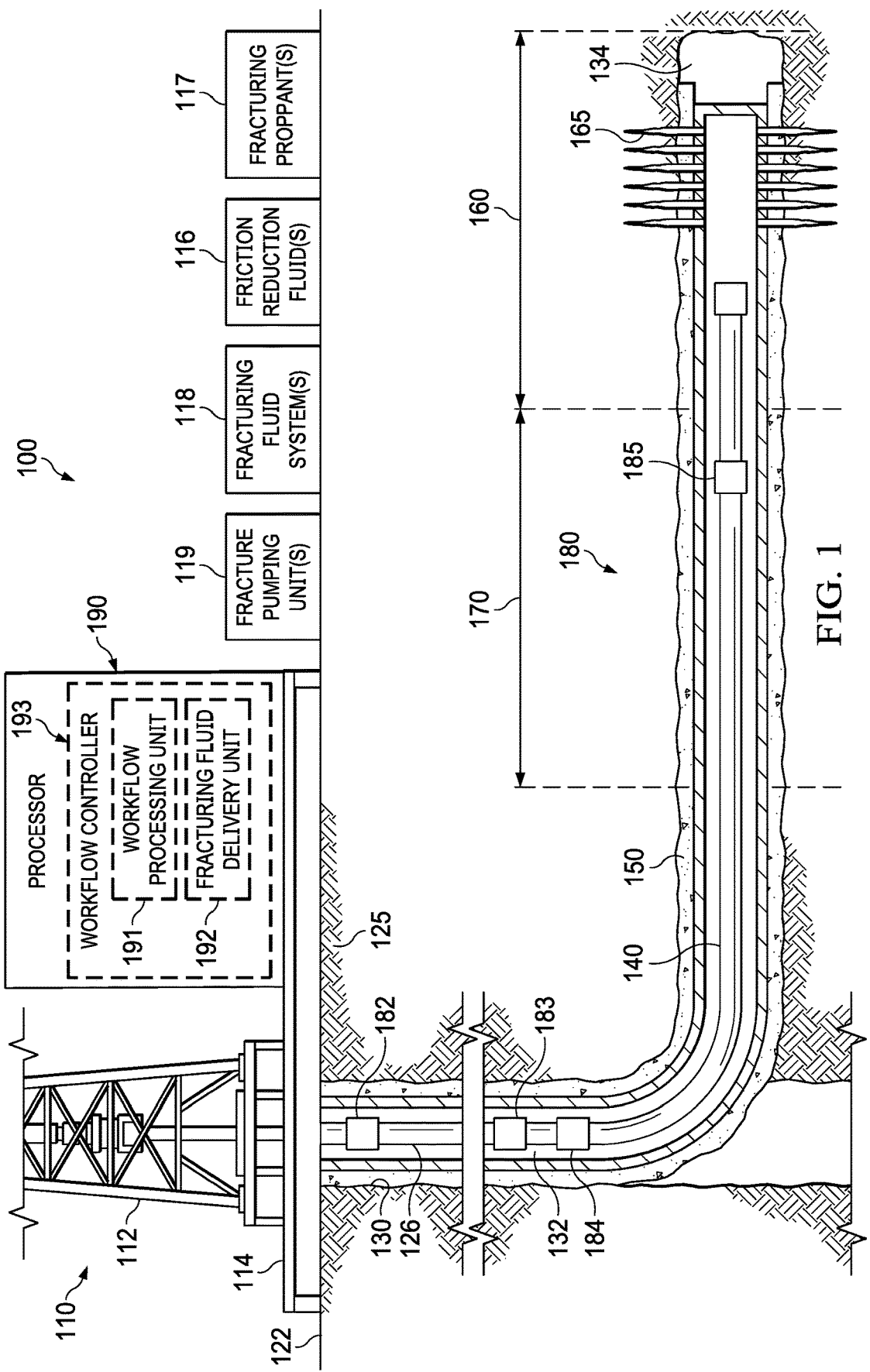
FIG. 1 illustrates a hydrocarbon wellbore fracturing system constructed according to the principles of this disclosure.

This disclosure provides fracturing workflows that allow selection and recommendation of one or more fracturing fluid systems for a wellbore. These selections and recommendations address both pre-job planning and real-time operating conditions and employ a relative treating pressure model and a proppant transport efficiency model that provide field-scalable laboratory data. Friction reducers, particularly viscosifying friction reducers, have competing performance requirements. In general, proppant transport capability has to be sacrificed in order to maximize friction reduction and pump wear and tear, for example. An optimal balance is dependent on a friction reducer selection as well as individual wellbore application conditions and requirements. For example, an optimal fluid system can change dramatically depending on water quality available for a fracturing job. Additionally, differentiation in the friction reducer market has become more difficult to achieve as it has become increasingly commoditized where numerous friction reduction products are marketed without clear performance distinctions.

The disclosure provides examples of fracturing workflows that address selection of a more appropriate fluid system recommendation for application to varying wellbore conditions, as well as, provide a more comprehensive relative performance analysis in a variety of application conditions. Additionally, design recommendations may be addressed when moving to a new fluid system and real-time fluid system selection or optimization recommendations for changing application conditions or requirements may be addressed. These may include competing fluid system performance factors such as transport efficiency, friction reduction or equipment maintenance, for a wide array of application conditions such as water quality, wellbore geometry, fracturing fleet makeup and pumping schedule. These may be subject to a variety of customizable performance goals such as minimization of fracture treating pressure, maintenance issues, pumping times, fuel consumption or total cost of ownership (TCO) issues while maximizing proppant concentration and slurry rate.

For purposes of this disclosure, the term "workflow" is defined as an orchestrated and repeatable pattern of activity that is enabled by a systematic organization of resources to process information, transform materials or provide services. Additionally, pre-job planning for fracturing of a subterranean formation is defined as determining one or more fracturing fluid systems that may be applied through a wellbore to provide fracturing of a subterranean formation before an actual fracturing operation begins. Correspondingly, real-time operating for fracturing of a subterranean formation is defined as actually applying a selected or recommended fracturing fluid system through a wellbore to provide fracturing of the subterranean formation. And, a proppant distribution index (PDI) is defined as a general index for how well a particular fracturing fluid system conveys proppant for a particular set of wellbore or environmental conditions. Also, the PDI is a means of quantifying the ability of a fracturing fluid system to convey proppant under the particular set of conditions.

FIG. 1 illustrates a hydrocarbon wellbore fracturing system for a subterranean formation, generally designated 100, constructed according to the principles of this disclosure. The system 100 provides an example of an operating environment to discuss certain aspects of this disclosure. As depicted, the system 100 may suitably include a drilling rig 110 positioned on the earth's surface 122 and extending over and around a wellbore 130 penetrating a subterranean formation 125 for the purpose of primarily recovering hydrocarbons. The wellbore 130 may be drilled into the subterranean formation 125 using any suitable drilling technique. In one example, the drilling rig 110 includes a derrick 112 with a rig floor 114. The drilling rig 110 may be conventional and may include a motor driven winch or other associated equipment for extending a work string, or a casing string into the wellbore 130. The components of the system 100 can be coupled together via conventional connections.

In one example, the wellbore 130 may extend substantially vertically away from the earth's surface 122 over a vertical wellbore portion 132, or may deviate at any angle from the earth's surface 120 over a deviated or horizontal wellbore portion 134. The wellbore 130 may include one or more deviated or horizontal wellbore portions 134. In alternative operating environments, portions or substantially all of the wellbore 130 may be vertical, deviated, horizontal or curved. The horizontal, vertical, curved, or deviated nature of any wellbore is not to be construed as limiting the disclosure to any particular wellbore configuration. The wellbore 130 includes a casing string 140. In the example of FIG. 1, the casing string 140 is secured into position in the subterranean formation 125 in a conventional manner using cement 150.

In accordance with the disclosure, the system 100 includes one or more fracturing zones. While only two fracturing zones (e.g., a lower fracturing zone 160 and upper fracturing zone 170) are illustrated in FIG. 1, and it is further illustrated that the two fracturing zones are located in a horizontal section 134 of the wellbore 130, it should be understood that the number of fracturing zones for a given well system 100 is almost limitless, and the location of the fracturing zones is not limited to horizontal portions 134 of the wellbore 130. In the embodiment of FIG. 1, the lower fracturing zone 160 has already been fractured, as illustrated by the fractures 165 therein. In contrast, the upper fracturing zone 170 has not been fractured, but in this example is substantially ready for perforating and/or fracturing. Fracturing zones, such as those in FIG. 1, may vary in depth, length (e.g., 30-150 meters in certain situations), diameter, etc., and remain within the scope of the disclosure.

While the system 100 depicted in FIG. 1 illustrates a stationary drilling rig 110, one of ordinary skill in the art will readily appreciate that mobile workover rigs, wellbore servicing units (e.g., coiled tubing units), and the like may be similarly employed. Further, while the system 100 depicted in FIG. 1 refers to a wellbore penetrating the earth's surface on dry land, it should be understood that one or more of the apparatuses, systems or methods illustrated herein may alternatively be employed in other operational environments, such as within an offshore wellbore operational environment, for example, a wellbore penetrating a subterranean formation beneath a body of water. Although the system 100 provides examples of fracturing for a single wellbore, multiple wellbores may employ fracturing operations concurrently. These concurrent operations may employ a common source for fracturing resources such as friction reducing fluids and fracturing proppants, or they may be distributed to each wellbore or a subset of the total number of wellbores being fractured. Also, a multiple wellbore fracturing operation may employ a common central processor or divide wellbore processing among several processors. Additionally, a fracturing water quality analysis may be performed for a common water supply for a multiple wellbore operation, or may be performed individually for separate water supplies The system 100 additionally includes surface equipment such as one or more pumping units 119 and wellbore fracturing resources such as friction fluids 116, fracturing proppants 117 and fracturing fluid systems 118 employing at least a portion of the friction fluids 116 and fracturing proppants 117. In the illustrated example, these fracturing fluid systems 118 are pumped, by the pumping units 119, through a wellbore conveyance 126 to the downhole tool assembly 180. The wellbore conveyance 126 may be a drill pipe or another type of conveyance sufficient to handle the pressure used for fracturing. The hydrocarbon workflow system 100 further includes wellbore pressure determining means such as pressure gauges. These pressure gauges may include a wellhead pressure gauge 182 that provides a surface wellhead pressure (WHP) and a bottom hole pressure gauge 185 that provides a bottom hole gauge pressure (BHGP) that is communicated to the surface 122.

Additionally included is at least one wellbore pressure gauge (in this example, represented by WP1 183 through WPn 184 pressure gauges) that determines an intermediate wellbore pressure, which is communicated to the surface 122. These intermediate wellbore pressures may be employed to facilitate verification of a uniform fracturing fluid condition throughout the wellbore 130. In another example, electrical or optical sensors (not expressly shown)

may be placed in an annular space between casing and formation where they are typically cemented in place. These sensors are communicatively coupled to an electrical or optical cable (not expressly shown) that is controlled by a processor 190 at the surface 122. The optical cable may include multiple optical fibers that may be used for distributed temperature sensing or distributed acoustic sensing.

The processor 190 includes a workflow processing unit 191 having fracturing models or databases to determine functional aspects of one or more fracturing fluid systems that provide a fracturing fluid system recommendation for the subterranean formation; and a fracturing fluid delivery unit 192 that applies the fracturing fluid system recommendation to the subterranean formation. The workflow processing unit 191 and the fracturing fluid delivery unit 192 are included in a workflow controller 193 that is part of the processor 190, in this example.

The processor 190 calculates a wellbore friction pressure for a selected fracturing fluid system and manages the fracturing fluid system to maintain the wellbore friction pressure within predetermined limits. This wellbore friction pressure may be employed to calibrate or update a friction model that may be employed in fracturing the wellbore 130. The processor 190 may employ or store executable programs of sequences of software instructions to perform one or more of various calculations including a wellbore friction pressure, updating a wellbore friction model or selecting various fracturing fluid systems, for example. The software instructions of such programs may represent algorithms and be encoded in machine-executable form on non-transitory digital data storage media, (e.g., magnetic or optical disks, random-access memory (RAM), magnetic hard disks, flash memories, and/or read-only memory (ROM)), to enable the processor 190 to perform one, multiple or all of the steps of one or more of the described methods, functions, systems or apparatuses described herein. Portions of disclosed examples may relate to computer storage products with a non-transitory computer-readable medium that have program code thereon for performing various computer-implemented operations that embody a part of an apparatus, device or carry out the steps of a method set forth herein.

Non-transitory used herein refers to all computer-readable media except for transitory, propagating signals. Examples of non-transitory computer-readable media include, but are not limited to: magnetic media such as hard disks, floppy disks, and magnetic tape as well as optical media such as CD-ROM disks; magneto-optical media in general and hardware devices that are specially configured to store and execute program code, such as ROM and RAM devices. Examples of program code include both machine code, such as that produced by a compiler, and files containing higher level code that may be executed by the computer using an interpreter.

If real-time BHGP data is available, the processor 190 can employ the methodology of this disclosure and can be utilized for real-time control and optimization of a fracturing fluid system, including selection of a friction reducer and proppant type and concentration. Note that the disclosed method or approach includes the use of multiple BHGP data if available, which will serve to enhance the accuracy of the real-time calculations and improve operational decisions.

The disclosed approach may also be used to vary the concentration of friction reducers and/or types of friction reducers as well as a concentration of proppant over time (before/flush, during ramp-up, during stage, during ramp-down, after/flush) to determine fluid friction relationships that can be used to optimize treatment pressures in real time either during a current fracturing stage or from stage to stage. A real-time control algorithm may be included in the processor 190 acting as a surface equipment control system, where various step-up/step-down sequences may be introduced to automatically determine and differentiate fluid friction and proppant friction induced pressure drop.

The disclosed approach can additionally be used to also distinguish between friction pressures inside the wellbore and in the near-wellbore region including formation perforations. An example application of this disclosure may be to evaluate an effectiveness of a diversion treatment. All of this information may proactively be used to model bottom-hole treating pressure, and select combinations of friction reducers or friction reducer concentrations as well as a proppant concentration to reach a target bottom-hole treating pressure in real time. The measured data can be shared with real-time models, and the modeled data can be used to determine operating set-points for fracture treatments in real time. Additionally, the pressure response of a treatment can be measured enabling real-time fracture control and automation.

Figure 2:
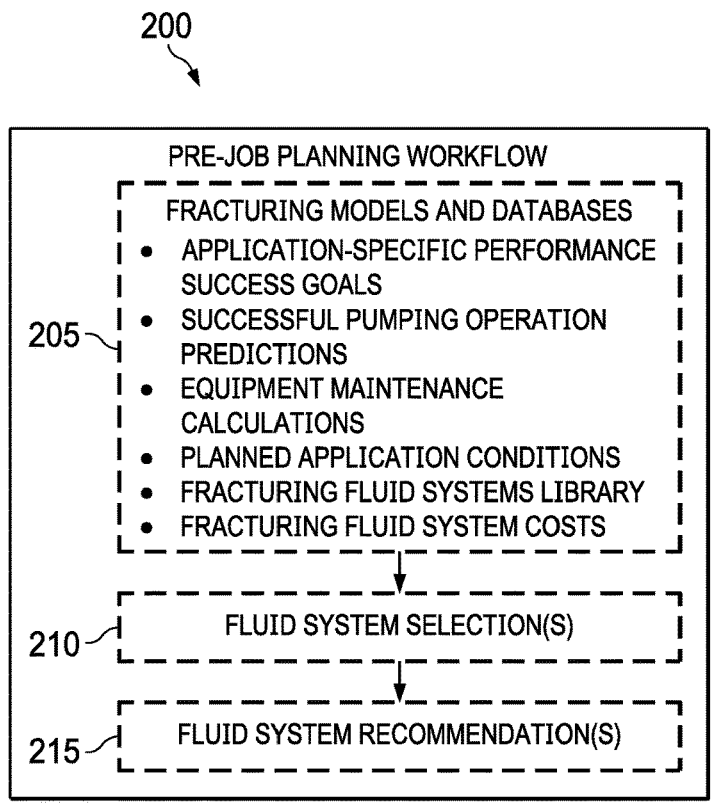
FIG. 2 illustrates an example of a pre-job planning workflow carried out according to principles of the present disclosure.

FIG. 2 illustrates an example of a pre-job planning workflow for fracturing a wellbore formation, generally designated 200, carried out according to principles of the disclosure. The pre-job planning workflow 200 illustrates a systematic organization of resources that may be employed for fracturing a wellbore formation, such as that shown in FIG. 1, as may be directed by the workflow controller 193. The pre-job planning workflow 200 employs pre-job planning fracturing models and databases 205, one or more pre-job planning fluid system selections 210 and one or more pre-job planning fluid system recommendations 215. In the illustrated example, pre-job planning fracturing models and databases 205 are included for application-specific performance success goals that focus on certain application areas such as minimizing friction or equipment maintenance or maximizing proppant transport, for example. Basically, the performance success goals focus on what is being optimized in a particular fractioning operation or application. This may also include keeping a cost factor within a specified range or maximizing proppant transport where available water sources are of poor quality.

Also included in the pre-job planning workflow 200 are fracturing models and databases 205 for predicting successful pumping of fracturing operations that may be difficult to achieve from a pure physics or first principles standpoint. That is, predetermining if pumping X gallons of friction reducer per thousand gallons of water at Y barrels per minute with Z pounds of proppant per gallon is going to be accomplished successfully. Or, if something is going to cause a "screen-out" that basically occurs when the proppant falls out of solution, causing wellbore pressure to increase to a point that one can no longer pump into the wellbore. Therefore, models or databases for successful pumping operation predictions may be employed that are based on historical results. This approach may basically be a "data bucket" approach, but could include physics-based models also.

Additionally the pre-job planning workflow 200 fracturing models and databases 205 for equipment maintenance calculations that are based on how many pumping trucks, what kind of pumping trucks and what kind of supporting equipment are being used for fracturing the wellbore formation. Knowing a treating pressure, a pumping rate and pumping equipment's rotational velocity as well as basically knowing how the pumps are going to be employed to complete a fracturing job enables calculation of wear and tear on the equipment or how much maintenance will be needed for the equipment based on the pumping conditions.

Further employed in the pre-job planning workflow 200 are fracturing models and databases 205 for planned application conditions that provide an overview or summary of wellbore conditions and fracturing water quality that are known ahead of time. These may include fluid performance issues that are tied to wellbore geometry and will affect the friction conditions or the amount of shear the fracturing fluid gets while pumping and will need to be addressed ahead of time. Knowing an amount and type of salts contained in the fracturing water that may be determined from a water analysis or relying on historical water data for the area may also be addressed. Still further included in the pre-job planning workflow 200 are fracturing models and databases 205 for a fracturing fluid system library and fracturing fluid system costs. Generation of these two items is further addressed below.

The one or more pre-job planning fluid system selections 210 employ fracturing fluid system selections from the fracturing fluid systems library that are particularly suited for use in fracturing the wellbore formation being addressed or considered. This results in the one or more pre-job planning fluid system recommendations 215 being recommended for use in fracturing the wellbore formation under consideration.

Figure 3:
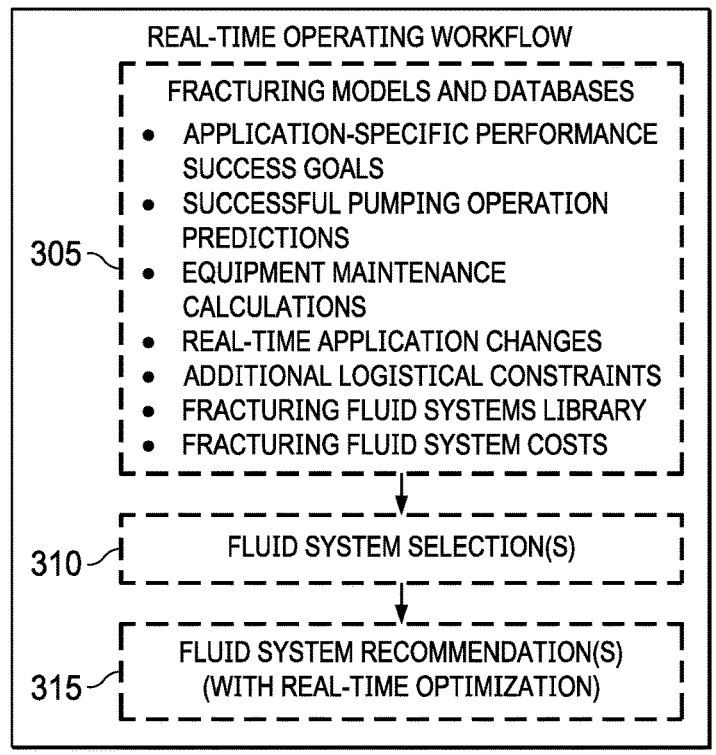
FIG. 3 illustrates an example of a real-time operating workflow carried out according to principles of the present disclosure.

FIG. 3 illustrates an example of a real-time operating workflow for fracturing through a wellbore, generally designated 300, carried out according to principles of the disclosure. The real-time operating workflow 300 also illustrates a systematic organization of resources that may be employed for fracturing a wellbore formation, such as that shown in FIG. 1 and are organized for real-time fracturing conditions. The workflow controller 193 provides control of generating real-time fracturing models and databases 305, one or more real-time fluid system selections 310 and one or more fluid system recommendations 315. In the illustrated example, the one or more fluid system recommendations 315 have real-time optimization capability, as well.

The real-time operating fracturing models and databases 305 employ application-specific performance success goals, successful pumping operation predictions and equipment maintenance calculations, as before. These three areas mirror those discussed with respect to FIG. 2. However, all of the real-time operating fracturing models and databases 305 have to "live on location" meaning that they are subject to being updated and modified in real time to accommodate changes generated by a wellbore fracturing environment currently being addressed and engaged in. Therefore, these three workflow areas are required to accommodate changes and upgrades in real time, as differentiated for their roles in pre-job planning applications. Additionally, the real-time operating fracturing models and databases 305 include areas for real-time application changes and additional logical constraints. These last two areas may have to accommodate changes corresponding to conditions such as different water quality availability, higher than expected treating pressures required, being forced to switch to different fracturing fluids and proppants and only part of a needed 150 million gallons per month is available, for example.

The one or more real-time fluid system selections 310 includes fracturing fluid system selections from the fracturing fluid systems library that are particularly suited for use in fracturing the wellbore formation being addressed or considered. This results in the one or more pre-job planning fluid system recommendations 315 being recommended for use in fracturing the wellbore under consideration.

Figure 4:
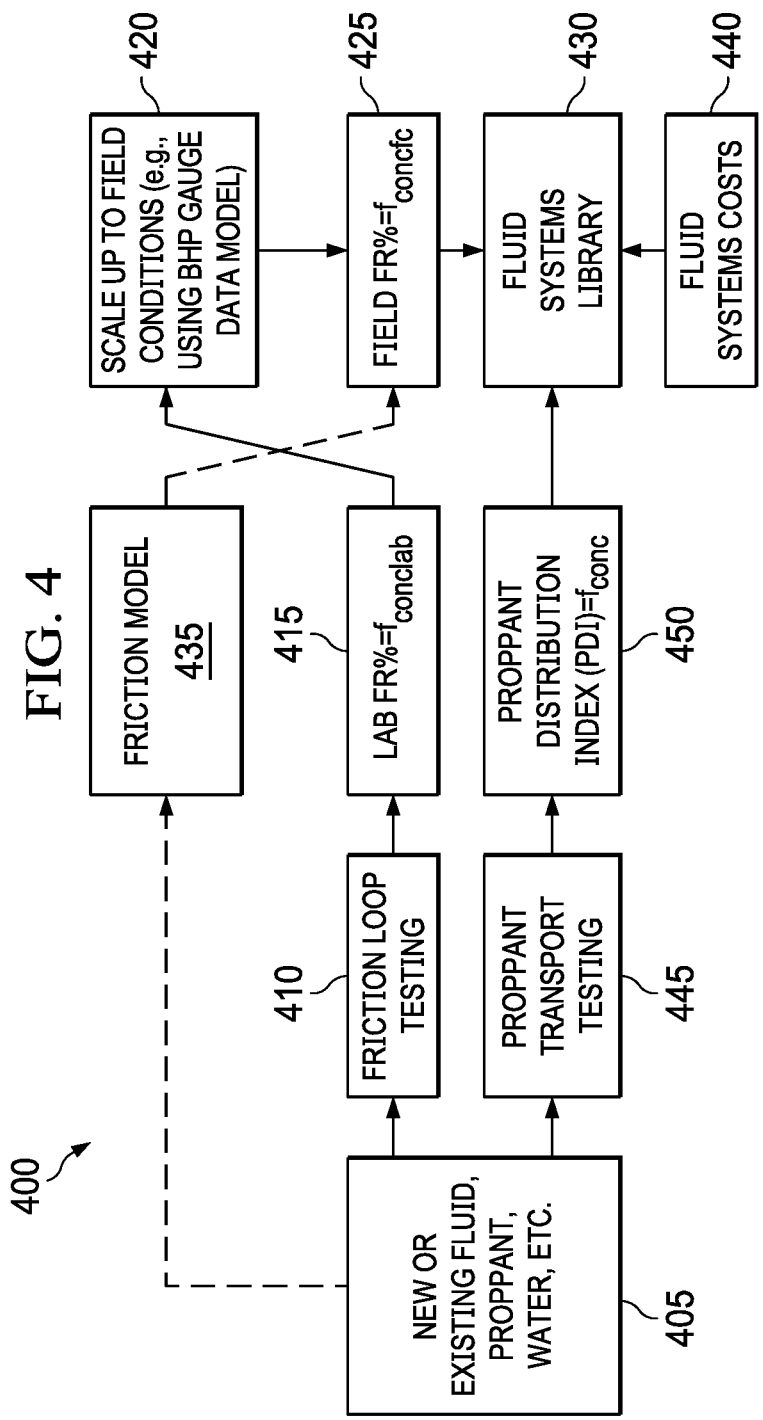
FIG. 4 illustrates an example of a workflow for generating a pre-job fracturing fluid system library carried out according to the principles of the disclosure.

FIG. 4 illustrates an example of a workflow for generating a pre-job fracturing fluid system library, generally designated 400, carried out according to the principles of the disclosure. The workflow 400 may be carried out in the processor 190 as directed by the workflow controller 193 and begins with a new or existing fluid, proppant and water combination in a workflow stage 405. Then, in one example, the workflow 400 moves to a friction loop testing workflow stage 410 wherein the friction loop testing results in a laboratory friction reduction fluid percentage (fconclab), in a workflow stage 415, that is scaled up to field conditions in a workflow stage 420. If a friction model exists, this scaled up result may be alternately employed in a workflow stage 435 to provide a "scaled-up to field conditions" (fconcfc) in the workflow stage 425 to become part of the fluid systems library in the workflow stage 430. Field systems costs in a workflow stage 440 are provided that correspond to the field systems library contents. Additionally, proppant transport testing may be accomplished in a workflow stage 445 that leads to a proppant distribution index (PDI) in a workflow stage 450 for inclusion in the fluid systems library.

In one example, the friction loop testing workflow stage 410 may employ a method of calculating a friction pressure for a wellbore wherein a uniform fluid condition is provided for a fracturing fluid in the wellbore. Then, time-series bottom hole gauge pressure data are sampled in the wellbore after the uniform fluid condition of the fracturing fluid is achieved. The samples of the time-series data may be processed to improve data sample quality wherein this processing may generally include cleaning or filtering of the samples of the time-series bottom hole gauge pressure data. A friction pressure is calculated for each sample of the time-series bottom hole gauge pressure data, and this calculated friction pressure may be employed for scaling laboratory data to determine friction pressure in a hydraulic fracturing stage. Additionally, the proppant transport testing may be accomplished for the workflow stage 445, in one example, by employing a slot flow test wherein the proppant distribution index (PDI) is plotted versus a viscosity of a fracturing fluid solution.

Figure 5:
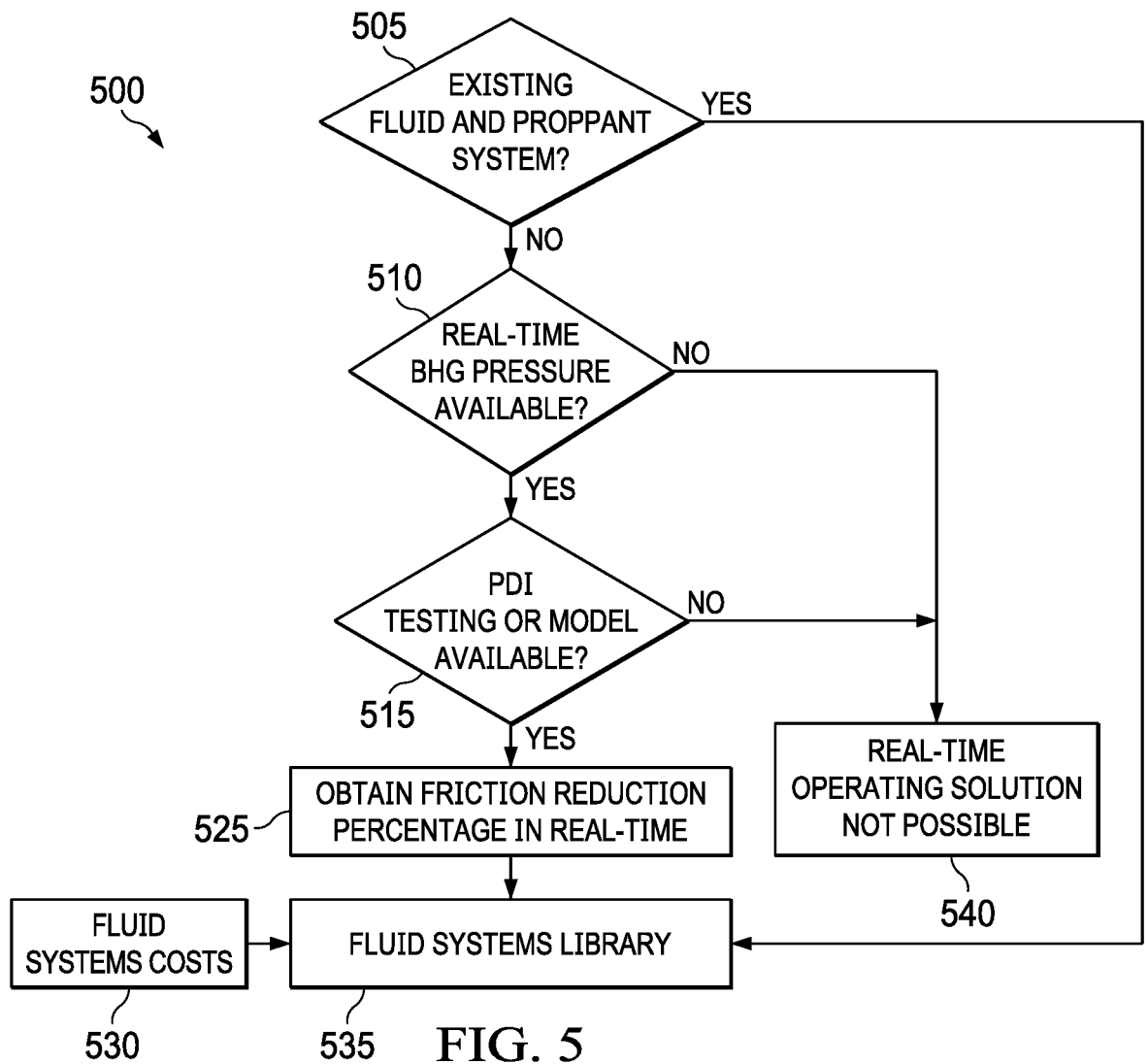
FIG. 5 illustrates an example of a workflow for generating a real-time fracturing fluid system library carried out according to the principles of the disclosure.

FIG. 5 illustrates an example of a workflow for generating a real-time fracturing fluid system library, generally designated 500, carried out according to the principles of the disclosure. The workflow 500 may be carried out in the processor 190 as directed by the workflow controller 193 of FIG. 1 wherein generation of a real-time fluid systems library begins with a determination as to if an existing fluid and proppant system exists in a workflow stage 505. If it does exist in the workflow stage 505, it is added to the fluid systems library in a workflow stage 535. A fluid systems cost for this existing fluid and proppant system is added in a workflow stage 530. Alternately, if a real-time bottom hole gauge (BHG) pressure in the workflow stage 510 and a proppant distribution index (PDI) from testing or a model are available in the workflow stage 515, then a real-time friction reduction percentage (FR %) in a workflow stage 525 can be obtained resulting in an addition to the fluid systems library in the workflow stage 535. Again, a fluid system cost can be added in the workflow stage 530. However, if either of the real-time bottom hole gauge (BHG) pressure in the workflow stage 510 or the proppant distribution index (PDI) testing or model in the workflow stage 515 are not available, a real-time operating solution to real-time fluid systems library generation is not available as indicated in a workflow stage 540

Figure 6:
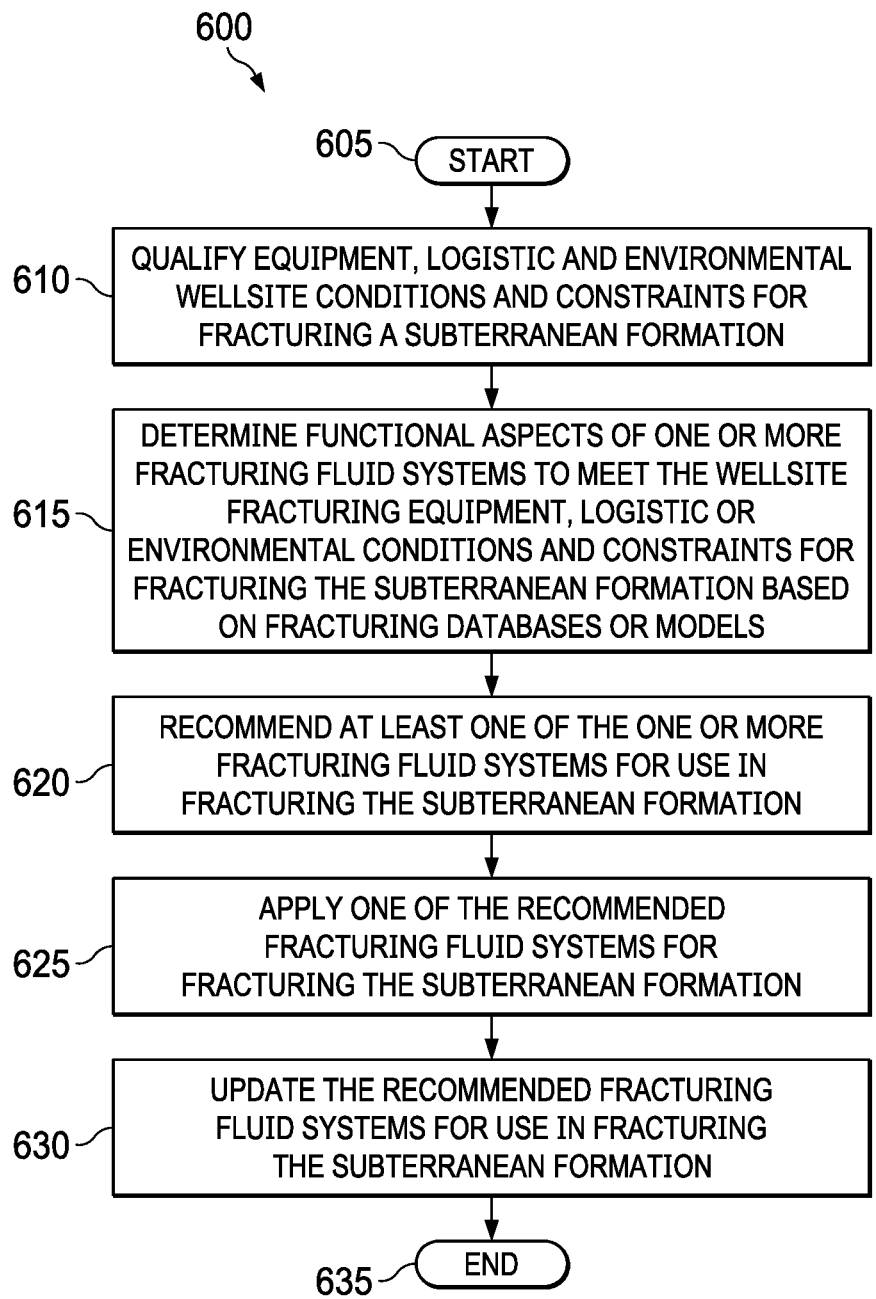
FIG. 6 illustrates an example of a workflow for fracturing a subterranean formation carried out according to the principles of the disclosure.

FIG. 6 illustrates an example of a workflow for fracturing a subterranean formation. The workflow 600 starts in a step (or stage) 605. Equipment, logistic and environmental wellsite conditions and constraints for fracturing the subterranean formation are qualified in a step 610. Then, functional aspects of one or more fracturing fluid systems are determined to meet the wellsite fracturing equipment, logistic or environmental conditions and constraints for fracturing the subterranean formation based on fracturing databases or models, in a step 615. At least one of the one or more fracturing fluid systems for use in fracturing the subterranean formation is recommended, in a step 620. In some examples, a processor, such as the processor 190 of FIG. 1 may provide the recommendation. One of the recommended fracturing fluid systems for fracturing the subterranean formation is applied, in a step 625. The recommended fracturing fluid systems for use in fracturing the subterranean formation are updated, in a step 630.

In one example, the recommended fracturing fluid system is applied in a real-time fracturing operation. In another example, the updating is based on changes in wellsite fracturing equipment, logistic or environmental conditions or constraints for fracturing the subterranean formation. In yet another example, selection of the fracturing databases and models includes friction loop testing at a fracturing wellsite corresponding to the subterranean formation. In still another example, selection of the fracturing databases or models includes friction loop testing at a fracturing wellsite corresponding to the subterranean formation. In a further example, determining the functional aspects of one or more fracturing fluid systems based on fracturing databases and models includes proppant transport testing. In a still further example, the proppant transport testing includes determining a proppant distribution index (PDI) by a slot flow test, a physical model, a database model, a statistical or empirical model, a performance model based on a past fracturing effort, a field or laboratory rheology test or a pipe flow test. In a yet further example, at least a portion of the databases or models correspond to application-specific performance success goals, successful pumping operations, equipment maintenance calculations, planned application conditions, real-time application changes, additional logistics constraints, fracturing fluid system costs or a fracturing fluid systems library. The workflow 600 ends in a step 635.

While the methods disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

A portion of the above-described apparatus, systems or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed examples or embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

Various aspects of the disclosure can be claimed including apparatuses, systems and workflows as disclosed herein. Aspects disclosed herein include:

A. A workflow for fracturing a subterranean formation including (1) qualifying equipment, logistic and environmental wellsite conditions and constraints for fracturing the subterranean formation, (2) determining functional aspects of one or more fracturing fluid systems to meet the equipment, logistic or environmental conditions and constraints for fracturing the subterranean formation based on fracturing databases or models, and (3) recommending at least one of the one or more fracturing fluid systems for use in fracturing the subterranean formation.

B. A workflow controller for fracturing a subterranean formation, including (1) a fracturing fluid delivery unit configured to apply a fracturing fluid system recommendation to the subterranean formation, and (2) a workflow processing unit configured to determine functional aspects of one or more fracturing fluid systems from fracturing models or databases to provide the fracturing fluid system recommendation for the subterranean formation.

C. A hydrocarbon wellbore fracturing system for a subterranean formation, including (1) wellbore fracturing resources coupled through a wellbore conveyance to the subterranean formation. (2) a fracturing fluid delivery unit that applies a fracturing fluid system recommendation to the subterranean formation, and (3) a workflow processing unit that determines functional aspects of one or more fracturing fluid systems from fracturing models or databases to provide the fracturing fluid system recommendation for the subterranean formation.

Each of aspects A, B and C can have one or more of the following additional elements in combination:

Element 1: further comprising applying a recommended one of the fracturing fluid systems for fracturing the subterranean formation. Element 2: wherein the recommended fracturing fluid system is applied in a real-time fracturing operation. Element 3: further comprising updating the recommended fracturing fluid systems for use in fracturing the subterranean formation. Element 4: wherein the updating is based on changes in equipment, logistic or environmental conditions or constraints for fracturing the subterranean formation. Element 5: wherein development of the fracturing databases and models includes friction loop testing at or apart from a fracturing wellsite corresponding to the subterranean formation. Element 6: wherein development of the fracturing databases or models includes measuring a bottomhole gage pressure of the fracturing wellsite corresponding to the subterranean formation. Element 7: wherein determining the functional aspects of one or more fracturing fluid systems based on fracturing databases and models includes proppant transport testing. Element 8 wherein the proppant transport testing includes determining a proppant distribution index (PDI) by a slot flow test, a physical model, a database model, a statistical or empirical model, a performance model based on a past fracturing effort, a field or laboratory rheology test or a pipe flow test. Element 9: wherein at least a portion of the databases and models correspond to application-specific performance success goals, successful pumping operations, equipment maintenance calculations, planned application conditions, real-time application changes, additional logistics constraints, fracturing fluid system costs or a fracturing fluid systems library. Element 10: further comprising a fracturing system processor that includes the workflow processing unit or the fracturing fluid delivery unit. Element 11: wherein the fracturing fluid system recommendation is applied by the fracturing fluid delivery unit in a real-time fracturing operation. Element 12: further comprising updating the fracturing fluid system recommendation during the real-time fracturing operation. Element 13: wherein the updating is based on changes in equipment, logistic or environmental conditions or constraints for fracturing the subterranean formation. Element 14: wherein the fracturing databases or models are developed through friction loop tests at or apart from a fracturing wellsite corresponding to the subterranean formation. Element 15: wherein the fracturing databases or models are developed through measurement of a bottomhole gage pressure of a fracturing wellsite corresponding to the subterranean formation: Element 16: wherein the functional aspects of the one or more fracturing fluid systems are based on fracturing models or databases developed through proppant transport testing. Element 17: wherein the proppant transport testing includes determination of a proppant distribution index (PDI) by a slot flow test, a physical model, a database model, a statistical or empirical model, a performance model based on a past fracturing effort, a field or laboratory rheology test or a pipe flow test. Element 18: wherein at least a portion of the databases or models corresponds to application-specific performance success goals, successful pumping operations, equipment maintenance calculations, planned application conditions, real-time application changes, additional logistics constraints, fracturing fluid system costs or a fracturing fluid systems library.

What is claimed is:

1. A workflow for fracturing a subterranean formation, comprising:
    qualifying equipment, logistic and environmental wellsite conditions and constraints for fracturing the subterranean formation;
    determining functional aspects of one or more fracturing fluid systems to meet the equipment, logistic or environmental conditions and constraints for fracturing the subterranean formation based on fracturing databases or models developed using a combination of proppant transport testing and friction loop testing;
    providing a recommendation for at least one of the one or more fracturing fluid systems for use in fracturing the subterranean formation; and
    performing a fracturing operation for the subterranean formation using the recommendation, wherein the proppant transport testing includes determining a proppant distribution index (PDI) and determining the PDI includes determining by a slot flow test, a physical model, a database model, a statistical or empirical model, a performance model based on a past fracturing effort, a field or laboratory rheology test or a pipe flow test.

2. The workflow as recited in claim 1 wherein the fracturing databases or models are included within a fracturing fluid system library.

3. The workflow as recited in claim 1 further comprising updating the recommended fracturing fluid systems for use in fracturing the subterranean formation.

4. The workflow as recited in claim 3 wherein the updating is based on changes in the equipment used for fracturing the subterranean formation.

5. The workflow as recited in claim 1 wherein the friction loop testing is conducted at or apart from a fracturing wellsite corresponding to the subterranean formation.

6. The workflow as recited in claim 5 wherein development of the fracturing databases or models includes measuring a bottomhole gage pressure of the fracturing wellsite corresponding to the subterranean formation.

7. The workflow as recited in claim 1 wherein at least a portion of the fracturing databases or models correspond to application-specific performance success goals.

8. The workflow as recited in claim 1 wherein at least a portion of the fracturing databases or models correspond to successful pumping operations, equipment maintenance calculations, planned application conditions, additional logistics constraints, or fracturing fluid system costs.

9. The workflow as recited in claim 1 wherein at least a portion of the databases or models correspond to real-time application changes.

10. The workflow as recited in claim 3 wherein the updating is based on changes in the logistic or environmental conditions or constraints for fracturing the subterranean formation.

11. A workflow controller for fracturing a subterranean formation, comprising:
    a fracturing system processor that includes:
        a workflow processing unit configured to determine functional aspects of one or more fracturing fluid systems from fracturing models or databases to provide the fracturing fluid system recommendation for the subterranean formation, wherein the fracturing models or databases are developed using a combination of proppant transport testing and friction loop testing; and
        a fracturing fluid delivery unit configured to apply the fracturing fluid system recommendation to the subterranean formation in a real-time fracturing operation, wherein the proppant transport testing includes determining a proppant distribution index (PDI) and the determining the PDI includes determining by a physical model, a database model, a statistical or empirical model, or a performance model based on a past fracturing effort.

12. The controller as recited in claim 11 wherein the friction loop testing includes friction reduction calculations.

13. The controller as recited in claim 11 further comprising updating the fracturing fluid system recommendation during the real-time fracturing operation.

14. The controller as recited in claim 13 wherein the updating is based on changes in equipment, logistic or environmental conditions or constraints for fracturing the subterranean formation.

15. The controller as recited in claim 11 wherein the friction loop tests are conducted at or apart from a fracturing wellsite corresponding to the subterranean formation.

16. The controller as recited in claim 11 wherein development of the fracturing databases or models uses measurements of a bottomhole gage pressure of a fracturing wellsite corresponding to the subterranean formation.

17. The controller as recited in claim 11 wherein the determining the PDI further includes determining by a slot flow test, a field or laboratory rheology test or a pipe flow test.

18. The controller as recited in claim 11 wherein at least a portion of the fracturing databases or models corresponds to application-specific performance success goals, successful pumping operations, equipment maintenance calculations, planned application conditions, real-time application changes, additional logistics constraints, fracturing fluid system costs or a fracturing fluid systems library.

19. A hydrocarbon wellbore fracturing system for a subterranean formation, comprising:
  wellbore fracturing resources coupled through a wellbore conveyance to the subterranean formation; and
  one or more processors that include:
    a workflow processing unit that determines functional aspects of one or more fracturing fluid systems from fracturing models or databases to provide the fracturing fluid system recommendation for the subterranean formation, wherein the fracturing models or databases are developed using a combination of proppant transport testing and friction loop testing; and
    a fracturing fluid delivery unit that applies the fracturing fluid system recommendation to the subterranean formation in a real-time fracturing operation, wherein the proppant transport testing includes determining a proppant distribution index (PDI) by a physical model, a database model, a statistical or empirical model, or a performance model based on a past fracturing effort.

20. The hydrocarbon wellbore fracturing system as recited in claim 19, wherein at least a portion of the fracturing databases or models correspond to real-time application changes.

21. The hydrocarbon wellbore fracturing system as recited in claim 19, wherein determining the PDI further includes determining by a slot flow test, a field or laboratory rheology test, or a pipe flow test.

* * * * *

UNITED STATES PATENT AND TRADEMARK OFFICE
CERTIFICATE OF CORRECTION

| | | |
|---|---|---|
| PATENT NO. | : 11,674,367 B2 | |
| APPLICATION NO. | : 16/675453 | |
| DATED | : June 13, 2023 | |
| INVENTOR(S) | : Aaron Gene Russell et al. | |

It is certified that error appears in the above-identified patent and that said Letters Patent is hereby corrected as shown below:

In the Specification
In Column 1, Line 15, after --Hydraulic fracturing or-- delete ""Tracking"" and insert --"fracking"--

Signed and Sealed this
Fifteenth Day of August, 2023

Katherine Kelly Vidal
*Director of the United States Patent and Trademark Office*